United States Patent
Kamiya et al.

(10) Patent No.: US 11,342,640 B2
(45) Date of Patent: May 24, 2022

(54) SECONDARY BATTERY

(71) Applicant: Envision AESC Japan Ltd., Zama (JP)

(72) Inventors: Sachiko Kamiya, Kanagawa (JP);
Yoshinori Naruoka, Kanagawa (JP);
Wataru Ogihara, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 142 days.

(21) Appl. No.: 16/483,591

(22) PCT Filed: Mar. 7, 2017

(86) PCT No.: PCT/JP2017/009062
§ 371 (c)(1),
(2) Date: Aug. 5, 2019

(87) PCT Pub. No.: WO2018/163293
PCT Pub. Date: Sep. 13, 2018

(65) Prior Publication Data
US 2020/0006743 A1    Jan. 2, 2020

(51) Int. Cl.
*H01M 4/62* (2006.01)
*H01M 50/578* (2021.01)
*H01M 4/134* (2010.01)
*H01M 4/38* (2006.01)
*H01M 50/46* (2021.01)

(52) U.S. Cl.
CPC ......... *H01M 50/578* (2021.01); *H01M 4/134* (2013.01); *H01M 4/386* (2013.01); *H01M 4/627* (2013.01); *H01M 50/461* (2021.01)

(58) Field of Classification Search
CPC combination set(s) only.
See application file for complete search history.

(56) References Cited

U.S. PATENT DOCUMENTS

| | | | |
|---|---|---|---|
| 2012/0107673 A1* | 5/2012 | Sakashita | H01M 50/54 429/163 |
| 2012/0244423 A1 | 9/2012 | Kusukawa et al. | |
| 2013/0052510 A1* | 2/2013 | Miyazaki | H01M 10/0585 429/156 |

(Continued)

FOREIGN PATENT DOCUMENTS

| | | |
|---|---|---|
| JP | 2011-60690 A | 3/2011 |
| JP | 2012-199162 A | 10/2012 |

(Continued)

*Primary Examiner* — Amanda J Barrow
(74) *Attorney, Agent, or Firm* — Global IP Counselors, LLP

(57) ABSTRACT

A secondary battery has a battery body and a restraint. The battery body has a plurality of stacked power generation elements. The restraint restrains the battery body. The restraint has a first contact section (for applying a restraining force to an outermost layer surface (e.g., a negative electrode collector) of the battery body. The restraint is configured so that a stress occurring at a boundary of a non-contact region and a contact region of the first contact section is less than a breaking strength of the negative electrode collector, and the stress is based on the restraining force and on expansion and contraction of a negative electrode due to a change in volume of a negative electrode active material layer caused by charging and discharging.

6 Claims, 11 Drawing Sheets

(56) References Cited

U.S. PATENT DOCUMENTS

| | | | | |
|---|---|---|---|---|
| 2015/0132631 A1* | 5/2015 | Lee | ............... | H01M 10/052 |
| | | | | 429/127 |
| 2015/0288022 A1* | 10/2015 | Lee | ............... | H01M 50/116 |
| | | | | 429/94 |
| 2016/0322626 A1* | 11/2016 | Okuda | ............... | H01G 11/52 |
| 2017/0018753 A1* | 1/2017 | Minagata | ............ | H01M 10/04 |
| 2018/0233771 A1* | 8/2018 | Miyazaki | ......... | H01M 10/0436 |

FOREIGN PATENT DOCUMENTS

| | | | | | |
|---|---|---|---|---|---|
| WO | 2014/188607 A1 | 11/2014 | | | |
| WO | 2017/033420 A | 3/2017 | | | |
| WO | WO 2017033420 | * | 3/2017 | ........ | H01M 10/0525 |

* cited by examiner

SECONDARY BATTERY

CROSS-REFERENCE TO RELATED APPLICATIONS

This application is a U.S. national stage application of International Application No. PCT/JP2017/009062, filed on Mar. 7, 2017.

BACKGROUND

Technical Field

The present invention relates to a secondary battery.

Background Information

A secondary battery has a battery body and a restraint. The battery body has a plurality of stacked power generation elements. The power generation elements have a positive electrode having a positive electrode collector in which a positive electrode active material layer is disposed on a surface thereof, an electrolyte layer for retaining an electrolyte, and a negative electrode having a negative electrode collector in which a negative electrode active material layer is disposed on a surface thereof. The positive electrode active material layer and the negative electrode active material layer face each other, interposed by the electrolyte layer.

The restraint is constituted from a pressure-sensitive-adhesive tape provided in order to prevent misalignment of constituent materials of the battery body (see International Publication No. WO 2014/188607, for example). The pressure-sensitive-adhesive tape extends from one outermost layer of the battery body, the layer being outermost in a stacking direction of the power generation elements, to another outermost layer of the battery body via a side of the battery body, and applies a restraining force to the one outermost layer and the other outermost layer of the battery body.

SUMMARY

A negative electrode active material containing silicon has been applied in a negative electrode active material layer in recent years for the purpose of increasing battery capacity.

However, silicon characteristically undergoes a large change in volume in response to charging and discharging of the secondary battery, and significantly expands and contracts in a direction of a plane intersecting with the stacking direction of the power generation elements. Problems therefore arise in the negative electrode collector positioned in at least one outermost layer of the battery body.

For example, in a contact region of the negative electrode collector, in which the pressure-sensitive-adhesive tape is in contact with the negative electrode collector, expansion and contraction is restricted, and there is therefore a marked difference between the contact region and a non-contact region with regard to an amount of expansion and contraction. Splitting of the negative electrode collector can therefore occur at a boundary (periphery of the contact region) of the contact region and the non-contact region.

Localized splitting of the negative electrode collector reduces battery output and/or battery capacity, and the localized splitting grows as a result of repeated charging and discharging of the secondary battery and can cause cycle characteristics (service life) to deteriorate.

The present invention was contrived in order to overcome the problems of the prior art described above, and an object of the present invention is to provide a secondary battery in which it is possible to suppress splitting of a negative electrode collector caused by contraction and expansion of a silicon-containing negative electrode active material layer.

The present invention for achieving the abovementioned object is a secondary battery comprising a battery body having a plurality of stacked power generation elements, and a restraint for restraining the battery body in a stacking direction of the power generation elements, a first contact section of the restraint for applying a restraining force to a surface of one outermost layer of the battery body being configured so that a stress occurring at a boundary of a non-contact region and a contact region of the first contact section is less than a breaking strength of the negative electrode collector, the stress being based on the restraining force and expansion and contraction of a negative electrode due to a change in volume of a negative electrode active material layer caused by charging and discharging.

The present invention is configured so that the stress occurring at the boundary of the non-contact region and the contact region of the first contact section is less than the breaking strength of the negative electrode collector, and the stress is relieved. Splitting of the negative electrode collector at the boundary (periphery of the contact region) of the contact region and the non-contact region is therefore suppressed. In other words, a secondary battery can be provided in which it is possible to suppress splitting of the negative electrode collector caused by contraction and expansion of the silicon-containing negative electrode active material layer.

Other objects, features, and characteristics of the present invention will become apparent from the preferred embodiments presented as examples in the following description and the accompanying drawings.

DETAILED DESCRIPTION OF THE EMBODIMENTS

Figure 1:
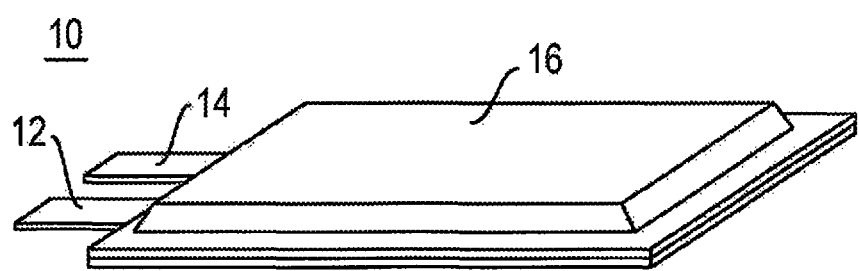
FIG. 1 is an oblique view illustrating a secondary battery according to an embodiment of the present invention.

Embodiments of the present invention are described below with reference to the accompanying drawings. Ratios of dimensions in the drawings are sometimes exaggerated for convenience of description, and may vary from actual ratios.

Figure 2:
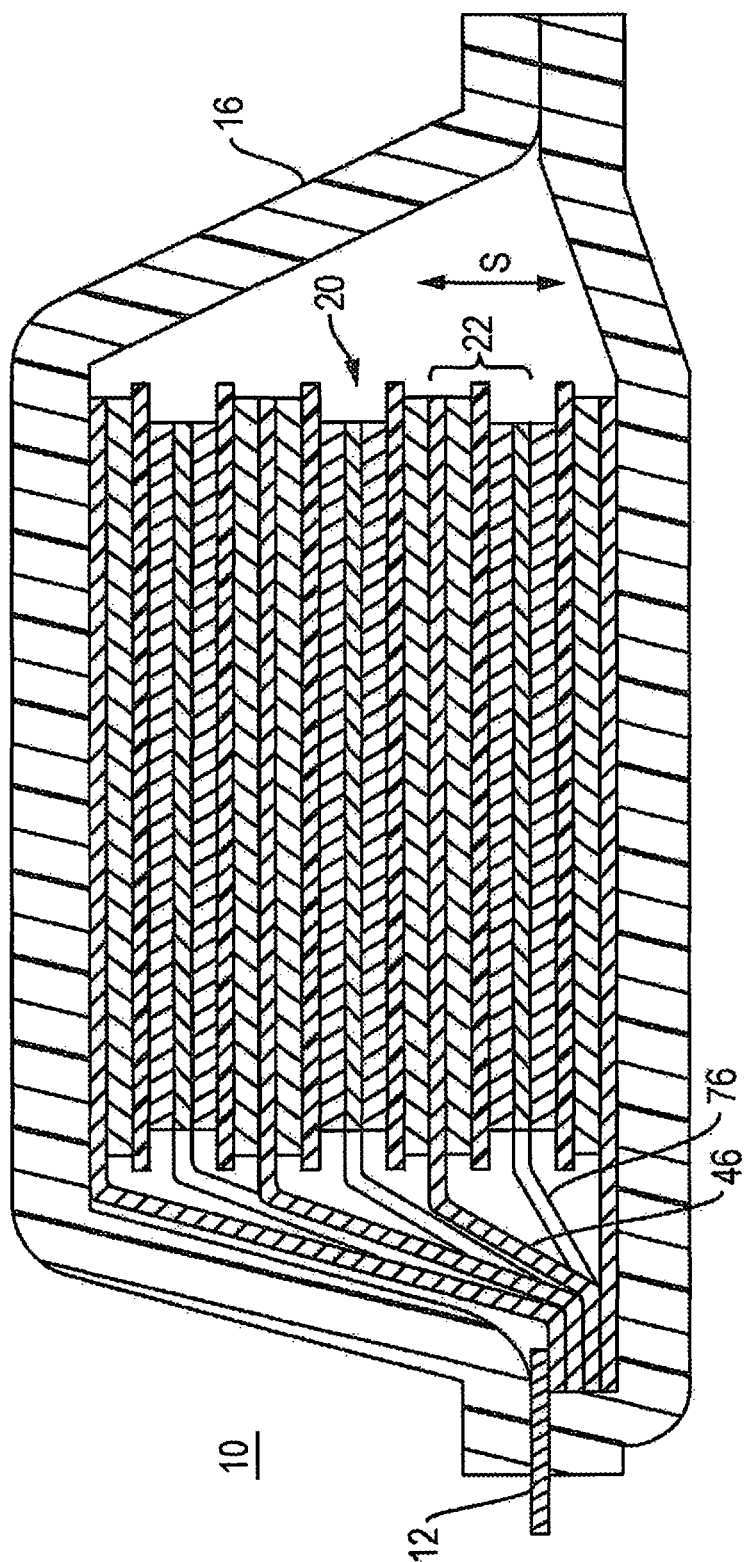
FIG. 2 is a sectional view of the secondary battery shown in FIG. 1.

FIG. 1 is an oblique view illustrating a secondary battery according to an embodiment of the present invention, and FIG. 2 is a sectional view of the secondary battery shown in FIG. 1.

A secondary battery 10 according to an embodiment of the present invention is a non-bipolar lithium-ion secondary battery, and has a negative electrode tab 12, a positive electrode tab 14, and an exterior body 16, as indicated in FIG. 1. The secondary battery 10 is configured as a battery assembly and used as a power source device for a vehicle, for example. The vehicle is an electric automobile or a hybrid electric automobile, for example.

The negative electrode tab 12 and the positive electrode tab 14 are electrode terminals comprising highly electroconductive members. The tabs extend out from inside the exterior body 16, and are used for sending out electric current. The negative electrode tab 12 and the positive electrode tab 14 are preferably covered by, for example, a heat-resistant and insulating heat-shrinkable tubing, and are thereby reliably prevented from coming in electrical contact with peripheral equipment, wiring, etc.

As indicated in FIG. 2, a battery body 20 and restraints 80 (not illustrated) are disposed inside the exterior body 16, and the exterior body 16 is used to prevent shock of external origin or environmental degradation. The exterior body 16 is formed by joining all or a portion of an external peripheral part of a sheet member. Examples of the joining method include thermal fusion bonding.

The battery body 20 has a plurality of power generation elements (unit batteries) 22. The power generation elements 22 are stacked and electrically connected in parallel. The restraints 80 (not illustrated) are used for restraining the battery body 20 in a stacking direction S of the power generation elements 22, as described hereinafter.

The highly electroconductive members constituting the negative electrode tab 12 and the positive electrode tab 14 are aluminum, copper, titanium, nickel, stainless steel, or an alloy thereof, for example.

The sheet member constituting the exterior body 16 is preferably constituted from a polymer-metal composite laminate film, for the sake of weight reduction and thermal conductivity. The polymer is polypropylene, polyethylene, or another thermoplastic resin material, for example. The metal is, for example, aluminum, stainless steel, nickel, copper, etc. (including alloys of these). The exterior body 16 is not limited to being constituted from a pair of laminate films (sheet members); for example, a laminate film formed in a bag shape in advance can be used as well.

The battery body and the power generation elements will next be described in detail.

Figure 3:
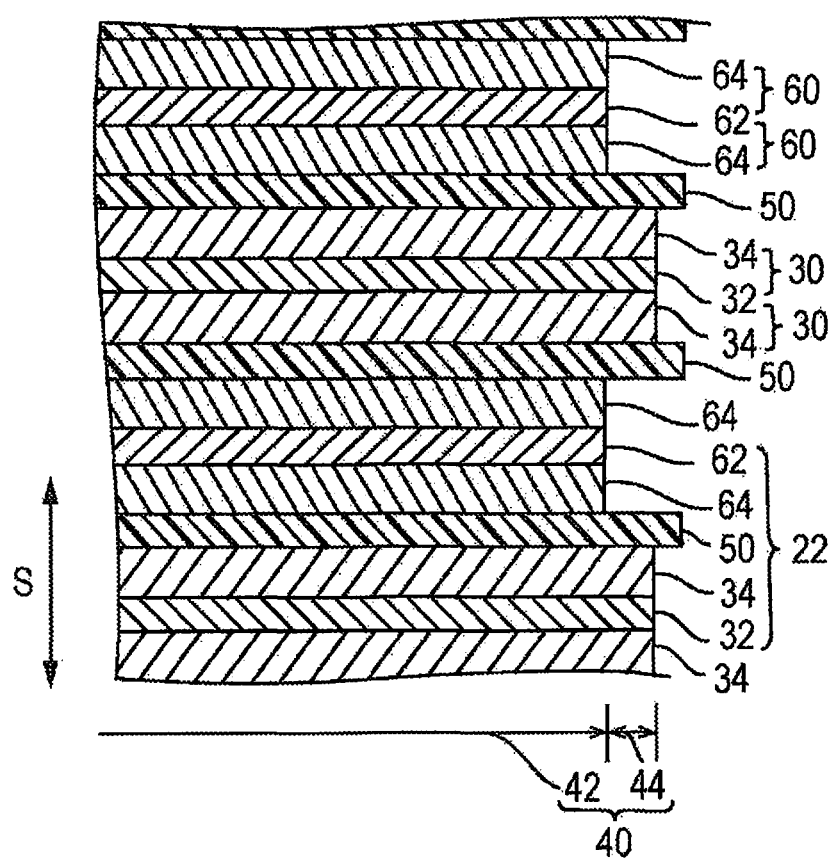
FIG. 3 is a sectional view illustrating a battery body and power generation elements shown in FIG. 2.

FIG. 3 is a sectional view illustrating the battery body and the power generation elements shown in FIG. 2.

As indicated in FIG. 3, the battery body 20 has negative electrodes 30, separators 50, and positive electrodes 60.

The negative electrodes 30 have a negative electrode collector 32 and substantially rectangular negative electrode active material layers 34. The negative electrode active material layers 34 are disposed on both surfaces of the negative electrode collector 32 in the stacking direction S. In other words, the negative electrode collector 32 is shared by adjacent negative electrodes 30. The negative electrode collector 32 is constituted from a copper foil having a thickness of, e.g., about 1-100 µm.

The negative electrode active material layers 34 contain a negative electrode active material and additives, and have a thickness of, e.g., about 1-100 µm. The negative electrode active material has a composition whereby lithium ions can be desorbed during discharging and lithium ions can be occluded during charging. The additives are a binder and an electroconductivity auxiliary. The binder is added for a purpose of maintaining the structure of the negative electrode, and has a function for binding together constituent materials of the negative electrode active material layers 34, and a function for causing the negative electrode active material layers 34 to bind to the negative electrode collector 32. The binder is constituted from carboxymethylcellulose (CMC) and styrene-butadiene rubber (SBR), for example. The electroconductivity auxiliary is constituted from a carbon material, etc., having good electrical conductivity, and is blended in order to enhance the electroconductivity of the negative electrode active material layers 34. The carbon material is acetylene black, for example.

In the present embodiment, the negative electrode active material includes a silicon-based material. Silicon has a better lithium ion occluding ability per unit volume than graphite, etc., which makes it possible to increase the capacity of a secondary battery. In particular, in the present embodiment, splitting of the negative electrode collector 32 caused by expansion and contraction of the negative electrode active material layer 34 is suppressed, as described hereinafter, and a negative electrode active material containing silicon, which has high expansibility, can therefore easily be applied.

The positive electrodes 60 have a positive electrode collector 62 and a substantially rectangular positive electrode active material layer 64. A positive electrode active material layer 64 is disposed on both surfaces of the positive electrode collector 62 in the stacking direction S. In other words, the positive electrode collector 62 is shared by adjacent positive electrodes 60.

The positive electrode collector 62 has a thickness of about 1-100 µm, for example. The material constituting the positive electrode collector 62 is the same as the material constituting the negative electrode collector 32.

The positive electrode active material layers 64 contain a positive electrode active material and additives, and have a thickness of about 1-100 µm, for example. The positive electrode active material has a composition whereby lithium ions can be desorbed during charging and lithium ions can be occluded during discharging. The positive electrode active material is $LiNiCoAlO_2$, for example. The additives are a binder and an electroconductivity auxiliary. The binder is added for a purpose of maintaining the structure of the positive electrode, and has a function for binding together constituent materials of the positive electrode active material layers 64, and a function for causing the positive electrode active material layers 64 to bind to the positive electrode collector 62. The binder is constituted from polyvinylidene fluoride (PVdF), for example. The electroconductivity auxiliary is blended in order to enhance the electroconductivity of the positive electrode active material layers 64, and is the same as the electroconductivity auxiliary in the negative electrodes 30.

The separators 50 are substantially rectangular porous material sheets (porous film) formed from polypropylene, and have a thickness of about 1-50 μm, for example. The separators 50 are disposed between the negative electrode active material layers 34 and the positive electrode active material layers 64, and the negative electrode active material layers 34 and the positive electrode active material layers 64 face each other, interposed by the separators 50.

The separators 50 are impregnated with an electrolyte, and constitute electrolyte layers for retaining the electrolyte. The electrolyte is a liquid electrolyte, for example. In other words, the separators 50 have a function for ensuring conductivity of lithium ions (carrier ions) between the positive electrodes 60 and the negative electrodes 30, and function as barriers between the positive electrodes 60 and the negative electrodes 30.

Each of the power generation elements 22 is constituted from a negative electrode collector 32, a negative electrode active material layer 34, a separator 50, a positive electrode active material layer 64, and a positive electrode collector 62.

The negative electrode active material layer 34 is configured so as to have a larger area than the positive electrode active material layer 64. A decrease in a facing area between the negative electrode active material layer 34 and the positive electrode active material layer 64 is thereby suppressed even when the positive electrode active material layer 64 becomes misaligned with the negative electrode active material layer 34. Fluctuation in power generation capacity due to a decrease in the facing area is therefore prevented.

The negative electrode collectors, the positive electrode collector, the silicon-based material of the negative electrode active material, the negative electrode binder, the positive electrode active material, the positive electrode binder, the electroconductivity auxiliary, the separators, and the composition of the electrolyte, etc., will next be described in this order.

The material constituting the negative electrode collectors and the positive electrode collectors is not limited to copper; another metal or an electroconductive resin is applicable. The other metal is aluminum, nickel, iron, stainless steel, titanium, a cladding material of nickel and aluminum, a cladding material of copper aluminum, or a cladding material of a combination of these metals, for example. The electroconductive resin is an electroconductive polymer material, an electroconductive polymer material to which an electroconductive filler is added, or a non-electroconductive polymer material to which an electroconductive filler is added, for example.

The silicon-based material of the negative electrode active material is silicon metal (elemental Si), a silicon alloy, a silicon oxide, a silicon compound, or a silicon semiconductor, for example. The silicon alloy includes aluminum, tin, zinc, nickel, copper, titanium, vanadium, magnesium, lithium, or another metal alloyed with silicon. The silicon alloy is preferably a Si—Sn—Ti-based alloy or another alloy based on three or more elements. The silicon oxide is $SiO_2$, SiO, $SiO_x$, etc. The $SiO_x$ is a mixture of amorphous $SiO_2$ particles and Si particles (where x represents a number of oxygen atoms satisfying a valence of Si). The silicon compound contains at least one component selected from the group consisting of lithium, carbon, aluminum, tin, zinc, nickel, copper, titanium, vanadium, and magnesium, for example. The negative electrode active material is not limited to a form including only one type of silicon-based material.

The negative electrode binder is not limited to a form including styrene-butadiene rubber (SBR) and carboxymethylcellulose (CMC). For example, a rubber-based binder other than styrene-butadiene rubber (SBR) or a water-soluble polymer other than carboxymethylcellulose (CMC) is also applicable as the negative electrode binder. The negative electrode binder may be a single material, or three or more materials may be used jointly as needed.

The positive electrode active material is not limited to a form including $LiNiCoAlO_2$, and $LiMn_2O_4$, $LiNiO_2$, $LiCoO_2$, $LiNiMnCoO_2$, $LiFePO_4$, etc., for example, are also applicable as appropriate.

The positive electrode binder is not limited to being constituted from polyvinylidene fluoride (PVdF).

The electroconductivity auxiliary is not limited to being constituted from acetylene black. For example, a carbon powder other than acetylene black, vapor-grown carbon fibers (VGCF®) and other carbon fibers, expanded graphite, etc. are also applicable.

The porous material sheet constituting the separators is not limited to being formed from polypropylene. For example, the porous material sheet can also be formed from polyethylene or another polyolefin other than polypropylene, a layered body in which a plurality of polyolefins are layered, polyimides, aramids, polyvinylidene fluoride-hexafluoropropylene (PVdF-HFP), glass fibers, etc. The separators can also be constituted from nonwoven fabric sheets. The nonwoven fabric sheets are formed from cotton, rayon, acetate, Nylon®, polyester, a polyolefin such as polyethylene or polypropylene, polyimides, aramids, etc., for example.

The liquid electrolyte retained by the separators has a solvent and a lithium salt as a supporting electrolyte dissolved in the solvent. Examples of the lithium salt is $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$. The solvent is ethylene carbonate (EC), propylene carbonate (PC), butylene carbonate (BC), vinylene carbonate (VC), dimethyl carbonate (DMC), diethyl carbonate (DEC), ethyl methyl carbonate (EMC), or methyl propyl carbonate (MPC), for example.

The electrolyte retained by the separators is not limited to a liquid electrolyte. For example, the separators can also retain a gel polymer electrolyte. The gel polymer electrolyte is constituted from a matrix polymer (host polymer) infused with a liquid electrolyte. The matrix polymer is an ion-conductive polymer. Examples of the ion-conductive polymer include polyethylene oxide (PEO), polypropylene oxide (PPO), and copolymers thereof.

A structure of the negative electrodes and the positive electrodes will next be described.

Figure 4:
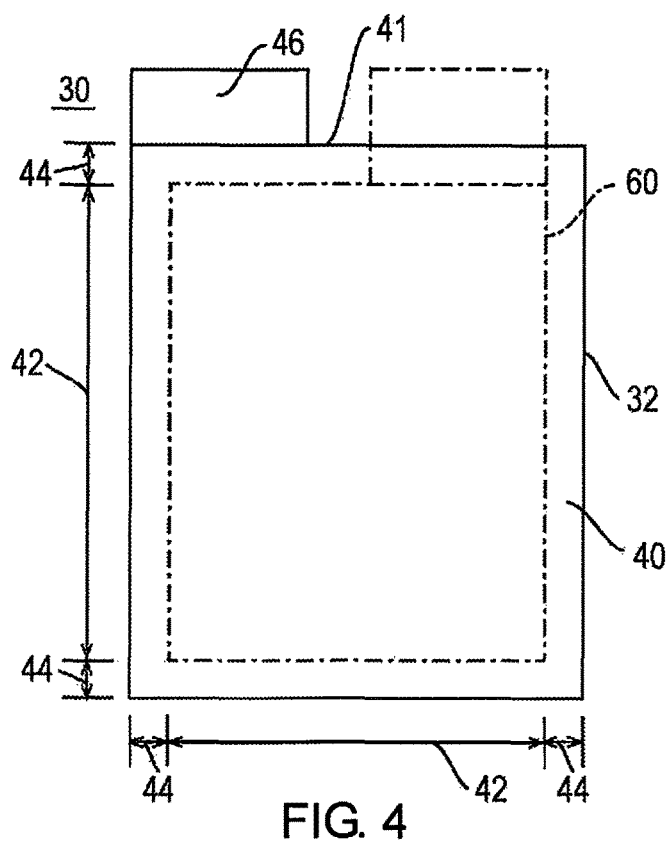
FIG. 4 is a plan view illustrating a negative electrode shown in FIG. 3.
Figure 5:
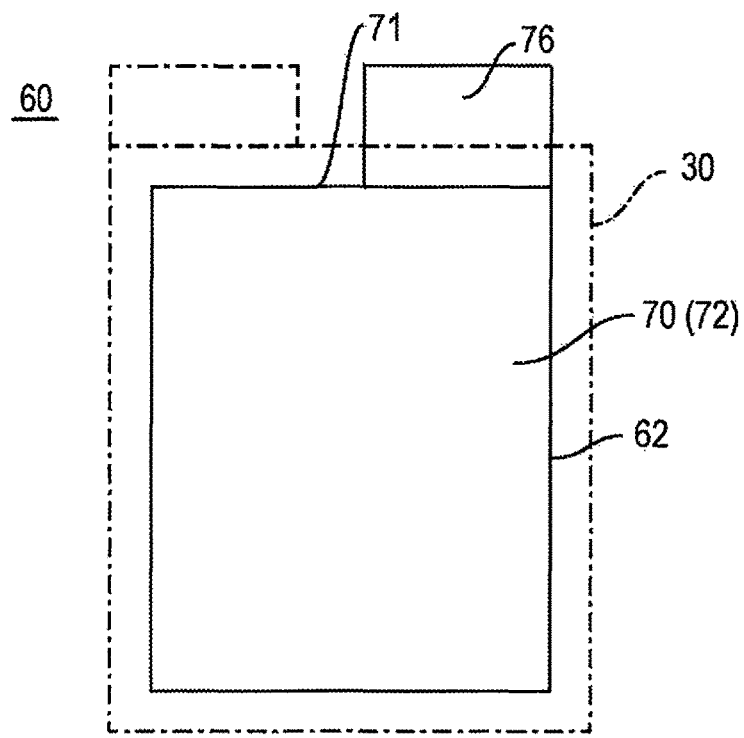
FIG. 5 is a plan view illustrating a positive electrode shown in FIG. 3.

FIGS. 4 and 5 are plan views illustrating a negative electrode and a positive electrode shown in FIG. 3.

As indicated in FIG. 4, the negative electrode collector 32 of the negative electrode 30 has an active material region 40 and a non-active-material region 46. The active material region 40 is a region in which the negative electrode active material layer 34 is disposed on a surface, and has a facing section 42 and a non-facing section 44.

The facing section 42 is a region facing the positive electrode active material layer 64, interposed by the separator 50, and the non-facing section 44 is a region not facing the positive electrode active material layer 64, the non-facing section 44 being positioned on a periphery (so as to surround the facing section 42) of the facing section 42 (see FIG. 3).

The non-active-material region 46 protrudes from one side 41 of the substantially rectangular active material region 40, and is joined (fixed) to the negative electrode tab 12 for drawing electric current toward the outside.

As indicated in FIG. 5, the positive electrode collector 62 of the positive electrode 60 has an active material region 70 and a non-active-material region 76. The active material region 70 is a region in which the positive electrode active material layer 64 is disposed on a surface, and is a facing section 72 facing the negative electrode active material layer 34, interposed by the separator 50.

The non-active-material region 76 protrudes from one side 71 of the substantially rectangular active material region 70, and is joined (fixed) to the positive electrode tab 14 for drawing electric current toward the outside.

The non-active-material region 76 is positioned so as not to overlap the non-active-material region 46 of the negative electrode collector 32 in the stacking direction S. Ultrasonic welding or resistance welding, for example, is applied to join the negative electrode tab 12 and the non-active-material region 46 of the negative electrode 30 and to join the positive electrode tab 14 and the non-active-material region 76 of the positive electrode 60.

The restraints will next be described.

Figure 6:
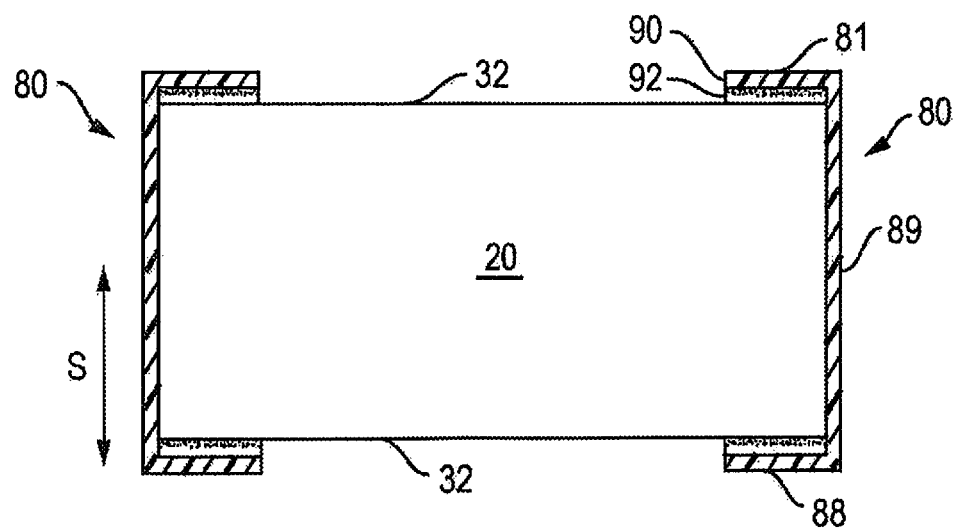
FIG. 6 is a sectional view illustrating restraints for restraining the battery body.

FIG. 6 is a sectional view illustrating the restraints for restraining the battery body.

As indicated in FIG. 6, the restraints 80 are substantially U-shaped in cross section, and have a first contact section 81, a second contact section 88, and a connecting section 89, and are used for restraining the battery body 20 in the stacking direction S. In the present embodiment, the secondary battery 10 has four restraints 80 disposed along a periphery of the battery body 20. The number of restraints 80 and the positions in which the restraints 80 are disposed are not limited to the above configuration.

The first contact sections 81 and the second contact sections 88 are used to apply a restraining force to one and another outermost layer of the battery body 20 in the stacking direction S. The restraining force is based on an adhesion force generated by adhesive material layers 92.

In the present embodiment, negative electrode collectors 32 are positioned in one and the other outermost layer of the battery body 20. Consequently, the first contact sections 81 and the second contact sections 88 apply restraining force to the negative electrode collectors 32 positioned in one and the other outermost layer of the battery body 20. The one and the other outermost layers of the battery body 20 may also be negative electrode active material layers 34 disposed on a surface of a negative electrode collector 32, but the example described below is of a case in which one and the other outermost layer of the battery body 20 are negative electrode collectors 32.

The connecting sections 89 extend alongside the battery body 20 in the stacking direction S and connect the first contact sections 81 and the second contact sections 88.

The restraints 80 are formed from a pressure-sensitive-adhesive film having a base material layer 90 and an adhesive material layer 92 supported by the base material layer 90. The pressure-sensitive-adhesive film is Kapton® tape, for example. The base material layer 90 is constituted from a polyimide film, etc. The adhesive material layer 92 is constituted from a silicon-based adhesive material, an acrylic-based adhesive material, etc. The pressure-sensitive-adhesive film constituting the connecting section 89 does not have the adhesive material layer 92, but can also be constituted so as to have the adhesive material layer 92, as needed.

The first contact sections 81 will next be described in detail. The second contact sections 88 have the same structure as the first contact sections 81 and will therefore not be described below, in order to avoid redundant description.

Figure 7:
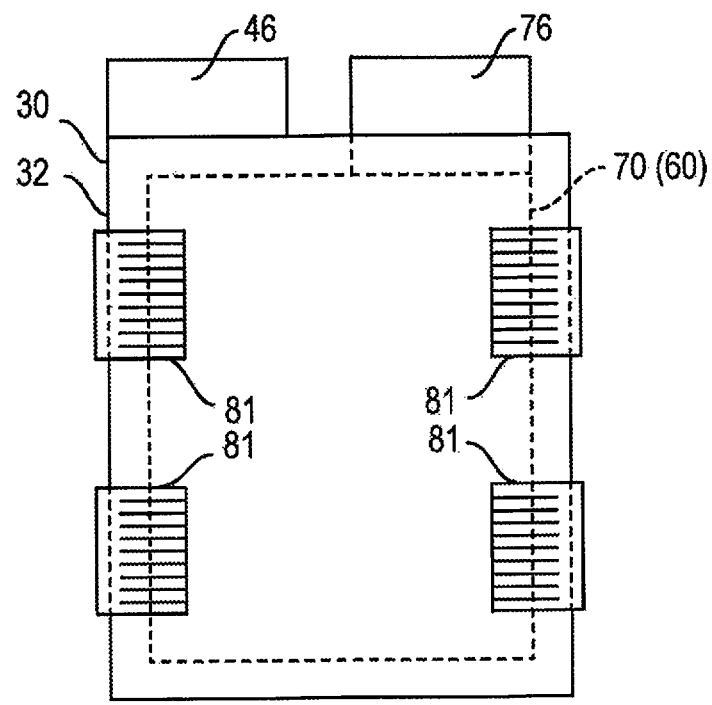
FIG. 7 is a plan view illustrating first contact sections shown in FIG. 6.
Figure 8:
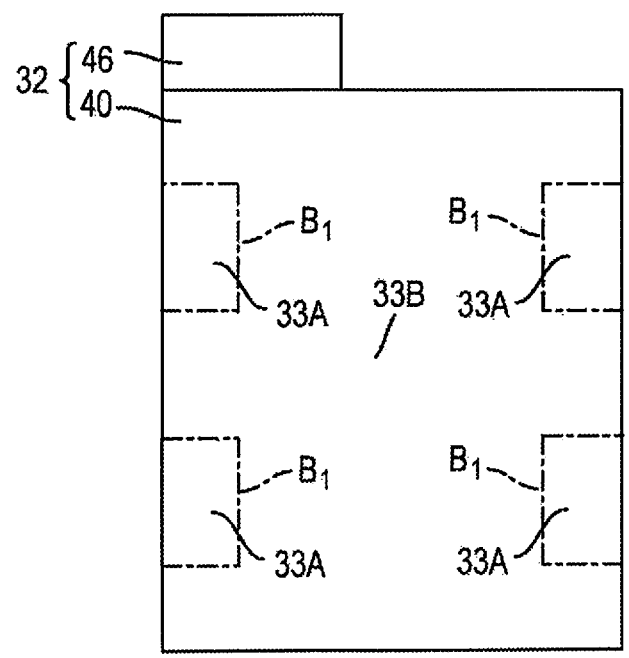
FIG. 8 is a plan view illustrating a negative electrode collector to which a restraining force is applied by the first contact sections.
Figure 9:
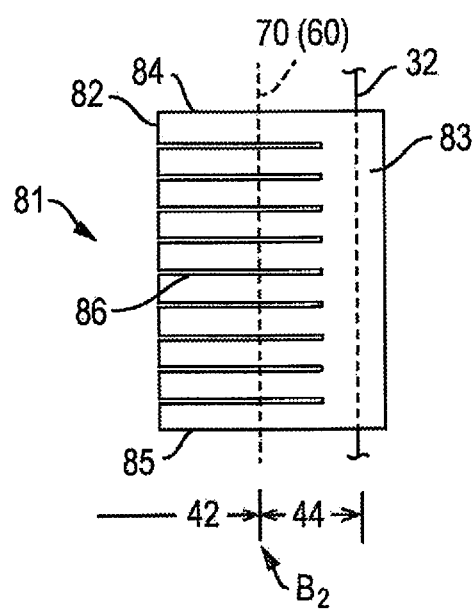
FIG. 9 is an enlarged view illustrating slits shown in FIG. 7.

FIG. 7 is a plan view illustrating the first contact sections shown in FIG. 6, FIG. 8 is a plan view illustrating a negative electrode collector to which restraining force is applied by the first contact sections, and FIG. 9 is an enlarged view illustrating slits shown in FIG. 7.

The first contact sections 81 shown in FIG. 7 are configured so that a stress occurring at boundaries $B_1$ of contact regions 33A and a non-contact region 33B shown in FIG. 8 is less than a breaking strength of the negative electrode collector 32. The contact regions 33A are regions in which the first contact sections 81 are in contact with a surface of the outermost layer (negative electrode collector 32 in the present example) of the battery body 20. The non-contact region 33B is a region in which the first contact sections 81 are not in contact. The stress is based on the restraining force of the first contact sections 81 and expansion and contraction of the negative electrode 30 due to a change in volume of the negative electrode active material layers caused by charging and discharging.

Specifically, as indicated in FIG. 9, the first contact sections 81 are substantially rectangular, and each have an end face 82, a base section 83, side faces 84, 85, and slits 86.

The base section 83 is linked to the connecting section 89 extending alongside the battery body 20. The end face 82 is a distal end located on an opposite side from the base section 83 and is positioned so as to face the facing section 42. The side faces 84, 85 link the end face 82 and the base section 83.

The slits 86 extend toward the base section 83 from the end face 82, and reach at least to a position facing a boundary $B_2$ of the facing section 42 and the non-facing section 44. The slits 86 expand and contract along the end face 82 (in an extension direction of the end face 82), and the stress occurring at the boundaries (periphery of the contact regions 33A) $B_1$ is thereby dispersed (relieved).

In other words, the first contact sections 81 are configured so as to expand and contract in accordance with the expansion and contraction of the negative electrode 30, and the stress occurring at the boundaries (periphery of the contact regions 33A) $B_1$ is thereby made less than the breaking strength of the negative electrode collector 32.

Consequently, it is possible to suppress splitting of the negative electrode collector 32 at the boundaries (periphery of the contact regions 33A) $B_1$, caused by expansion and contraction of the silicon-containing negative electrode active material layer. As a result, a decrease in battery output and/or battery capacity based on localized splitting of the negative electrode collector 32 is suppressed, growth of localized splitting of the negative electrode collector 32 due to repeated charging and discharging of the secondary battery is avoided, and deterioration of cycle characteristics (service life) is suppressed.

A method of forming the slits 86 is not particularly limited, and a cutter can be used, for example.

First to sixth modifications will next be described in order.

Figure 10:
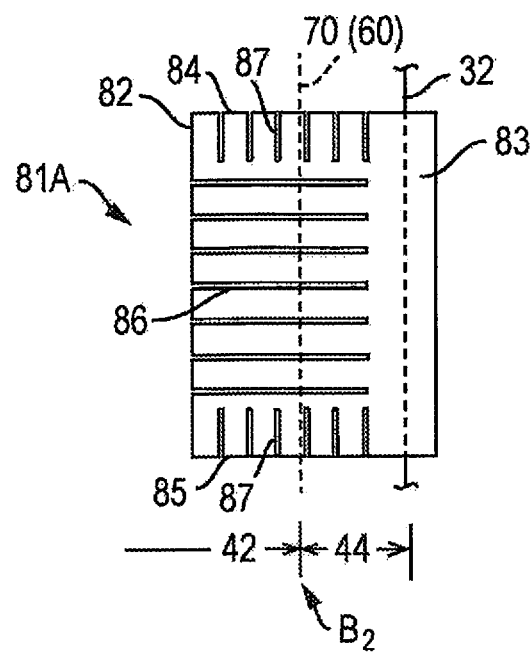
FIG. 10 is a plan view illustrating the first modification of an embodiment of the present invention.

FIG. 10 is a plan view illustrating the first modification of an embodiment of the present invention.

The restraints 80 can also have a first contact section 81A shown in FIG. 10. In addition to the slits 86 extending toward the base section 83 from the end faces 82, the first contact section 81A furthermore has slits 87A extending toward the side face 85 from the side face 84, and slits 87B extending toward the side face 84 from the side face 85. The slits 87A, 87B expand and contract along the side faces 84, 85 (in an extension direction of the side faces 84, 85), and the stress occurring at the boundaries (periphery of the contact regions 33A) $B_1$ is thereby dispersed (relieved).

Figure 11:
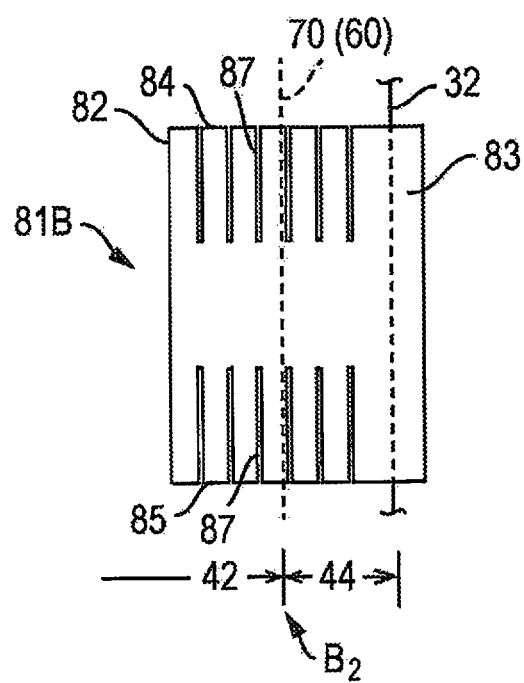
FIG. 11 is a plan view illustrating the second modification of an embodiment of the present invention.

FIG. 11 is a plan view illustrating the second modification of an embodiment of the present invention.

The restraints 80 can also have a first contact section 81B shown in FIG. 11. The first contact section 81B does not have the slits 86 extending toward the base section 83 from the end face 82, and has slits 87A extending toward the side face 85 from the side face 84, and slits 87B extending toward the side face 84 from the side face 85.

Figure 12:
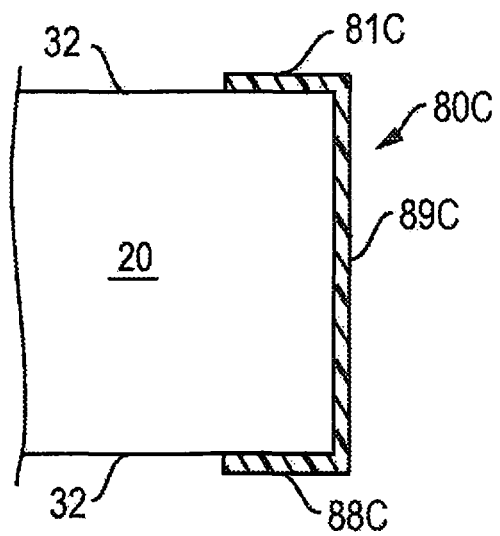
FIG. 12 is a sectional view illustrating the third modification of an embodiment of the present invention.

FIG. 12 is a sectional view illustrating the third modification of an embodiment of the present invention.

The secondary battery 10 can also have a restraint 80C shown in FIG. 12. The restraint 80C is constituted from an adhesive material having elasticity which enables the adhesive material to follow expansion and contraction of the negative electrode 30, and a first contact section 81C, a second contact section 88C, and a connecting section 89C are integrated in the restraint 80C. A restraining force of the first contact section 81C is based on an adhesive force generated by the adhesive material. The adhesive material is styrene-butadiene rubber (SBR), polyvinylidene fluoride (PVdF), a polyimide, polyacrylic acid, or another adhesive rubber material.

In this case, stress occurring at the boundaries (periphery of the contact regions 33A) $B_1$ is dispersed (relieved) by expansion and contraction of the first contact sections 81C as such. Specifically, an elasticity (Young's modulus) of the adhesive material is adjusted in advance so that the stress occurring at the boundaries $B_1$ by expansion and contraction of the negative electrode 30 in an actual usage environment of the secondary battery 10 is less than the breaking strength of the negative electrode collector 32. The restraint 80C can be formed by applying a liquid adhesive material to a predetermined region and then drying the adhesive material.

Figure 13:
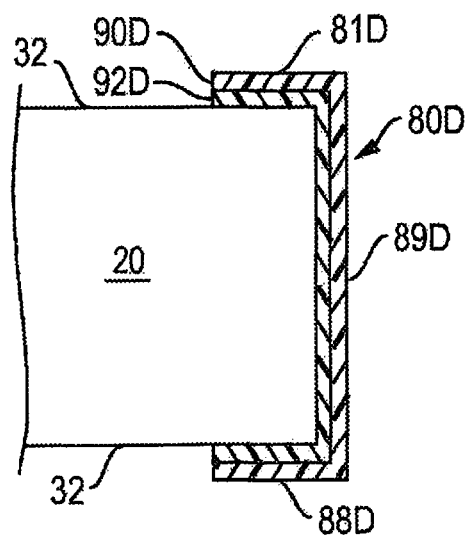
FIG. 13 is a sectional view illustrating the fourth modification of an embodiment of the present invention.

FIG. 13 is a sectional view illustrating the fourth modification of an embodiment of the present invention.

The secondary battery 10 can also have a restraint 80D shown in FIG. 13. The restraint 80D is formed from a pressure-sensitive-adhesive film having a base material layer 90D and an adhesive material layer 92D supported by the base material layer 90D, and a first contact section 81D, a second contact section 88D, and a connecting section 89D are integrated in the restraint 80D. A restraining force of the first contact section 81D is based on an adhesive force generated by the adhesive material layer 92D.

The adhesive material layer 92D is constituted from an adhesive material having elasticity which enables the adhesive material to follow expansion and contraction of the negative electrode 30, the same as in the third modification. In other words, the first contact section 81D corresponds to a configuration in which the base material layer 90D is combined with the first contact section 81C, and stress occurring at the boundaries (periphery of the contact regions 33A) $B_1$ is dispersed (relieved) by expansion and contraction of the adhesive material layer 92D as such.

Figure 14:
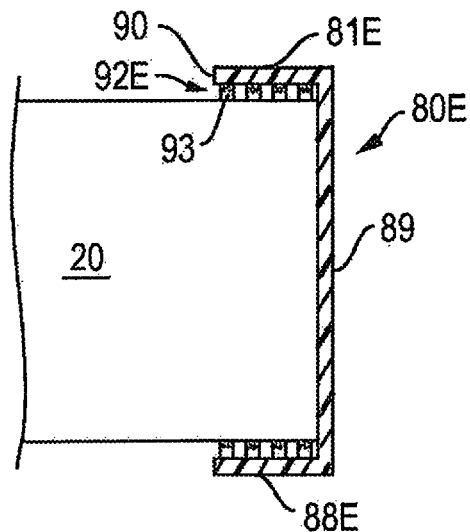
FIG. 14 is a sectional view illustrating the fifth modification of an embodiment of the present invention.
Figure 15:
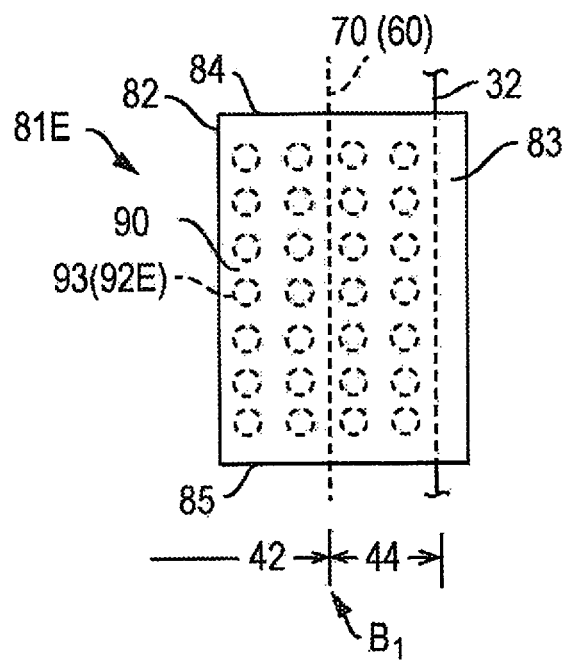
FIG. 15 is a plan view illustrating the fifth modification of an embodiment of the present invention.

FIG. 14 and FIG. 15 are a sectional view and a plan view, respectively, illustrating the fifth modification of an embodiment of the present invention.

The secondary battery 10 can also have a restraint 80E shown in FIG. 14. The restraint 80E is formed from a pressure-sensitive-adhesive film having a base material layer 90 and adhesive material layers 92E, and a first contact section 81E, a second contact section 88E, and a connecting section 89 are integrated in the restraint 80E. As indicated in FIG. 15, the adhesive material layers 92E are constituted from adhesive materials 93 disposed intermittently on the base material layer 90. A restraining force of the first contact section 81E is based on an adhesive force generated by the adhesive materials 93 (adhesive material layers 92E).

The adhesive force generated by the adhesive material layers 92E is set so as to be less than the breaking strength of the negative electrode collector 32 by adjusting a configuration in which the adhesive materials 93 are arranged. Consequently, the first contact section 81E disperses (relieves) stress occurring at the boundaries (periphery of the contact regions 33A) $B_1$. In other words, the stress can be made less than the breaking strength of the negative electrode collector 32. The configuration whereby the adhesive force generated by the adhesive material layers 92E is set is not particularly limited to the above configuration.

Figure 16:
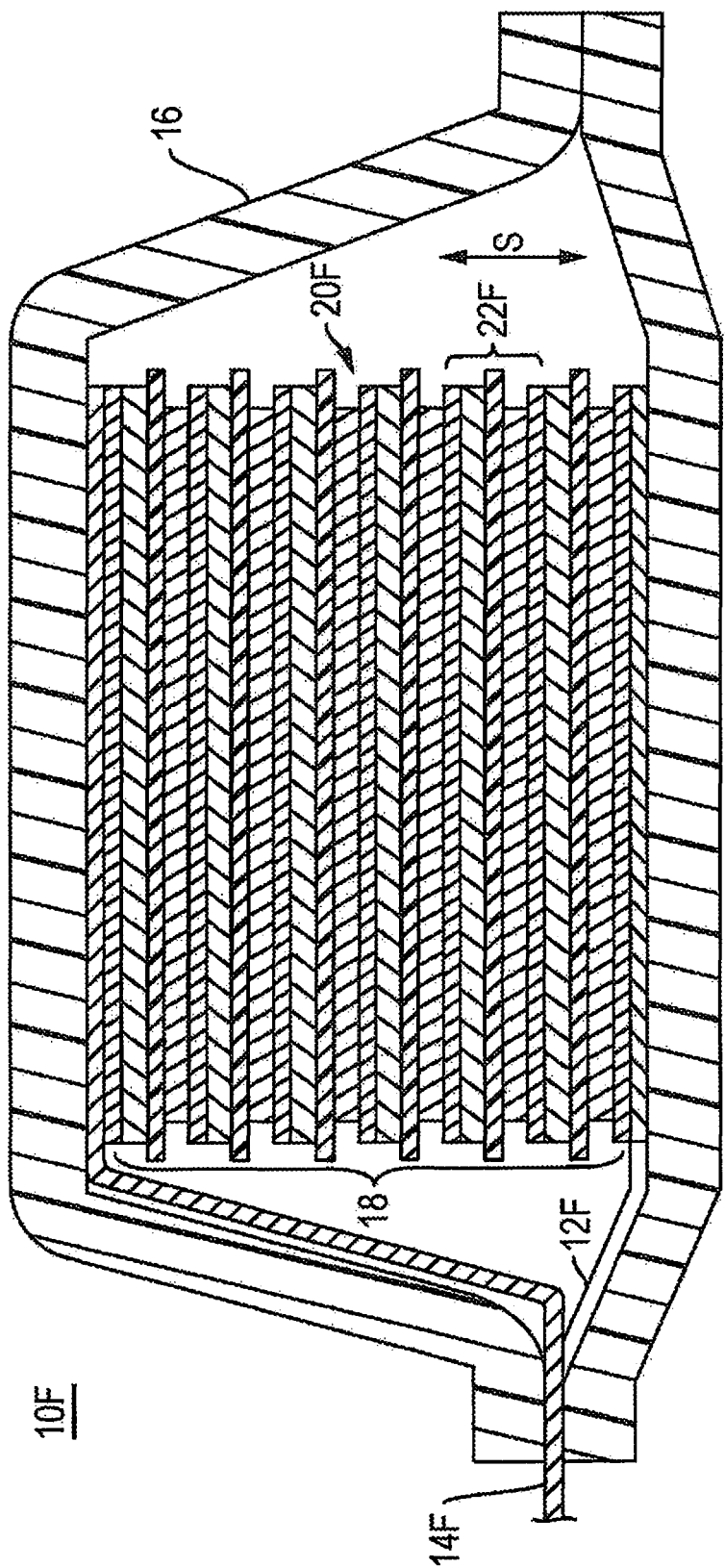
FIG. 16 is a sectional view illustrating the sixth modification of an embodiment of the present invention.
Figure 17:
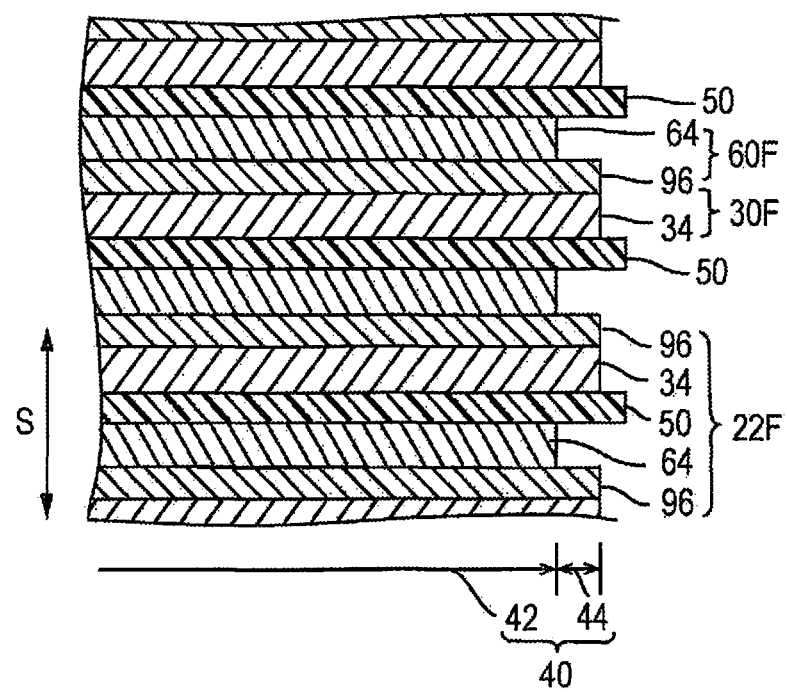
FIG. 17 is a sectional view illustrating the battery body and the power generation elements shown in FIG. 16.
Figure 18:
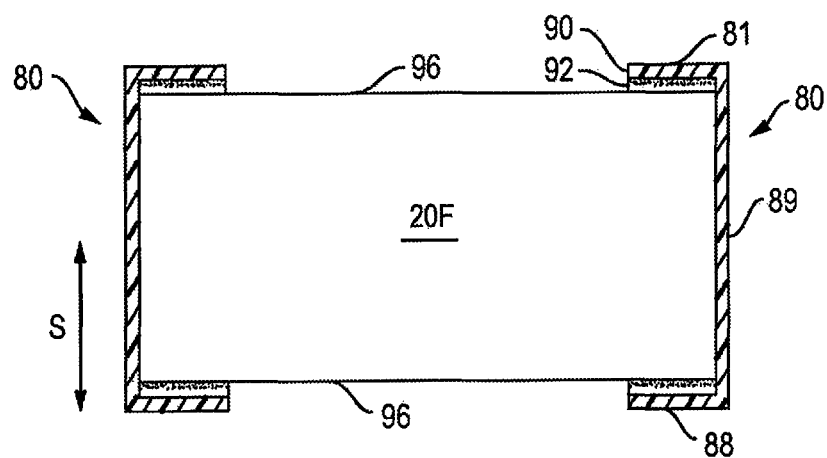
FIG. 18 is a sectional view illustrating the restraints for restraining the battery body.

FIG. 16 is a sectional view illustrating the sixth modification of an embodiment of the present invention, FIG. 17 is a sectional view illustrating the battery body and the power generation elements shown in FIG. 16, and FIG. 18 is a sectional view illustrating the restraints for restraining the battery body.

The restraints 80 can also be applied to a secondary battery 10F and a battery body 20F shown in FIG. 16. In order to avoid redundant description, members having the same function as members of the secondary battery 10 will not be described below.

Specifically, the secondary battery 10F is a bipolar lithium-ion secondary battery, and has a negative electrode tab 12F, a positive electrode tab 14F, and an exterior body 16. A battery body 20F, restraints 80 (see FIG. 18), and a seal (not illustrated) are disposed in the exterior body 16. The negative electrode tab 12F and the positive electrode tab 14F are disposed outside the battery body 20F, and are configured so as to at least cover an entire electrode projection surface.

As indicated in FIG. 17, the battery body 20F has negative electrode active material layers 34, separators 50, positive electrode active material layers 64, and collectors 96. The negative electrode active material layers 34 include a silicon-based material, and are disposed on one surface of the collectors 96. The positive electrode active material layers 64 are disposed on another surface of the collectors 96. A negative electrode active material layer 34 and a collectors 96 constitute a negative electrode 30F, and a positive electrode active material layer 64 and a collector 96 constitute a positive electrode 60F. In other words, the collector 96 is a bipolar collectors shared by the negative electrode 30F and the positive electrode 60F (serving as a negative electrode collector and a positive electrode collector).

The separators 50 are disposed between the negative electrode active material layers 34 and the positive electrode active material layers 64. Consequently, a collector 96, a negative electrode active material layer 34, a separator 50, a positive electrode active material layer 64, and a collector 96 constitute a power generation element (single unit battery) 22F. Power generation elements 22F are stacked and electrically connected in series.

The negative electrode active material layers 34 are configured so as to have a larger area than the positive electrode active material layers 64. Consequently, an active material region 40 of the collectors 96 in which the negative electrode active material layers 34 are disposed has a facing section 42 in which the electrode active material layers 64 are faced, interposed by the separators 50, and a non-facing section 44 in which the positive electrode active material layers 64 are not faced, the non-facing section 44 being positioned on the periphery (so as to surround the facing section 42) of the facing section 42 (see FIG. 17).

The seal is disposed so as to surround a periphery of the positive electrode active material layers 64 and the negative electrode active material layers 34, and is provided to seal at least a portion of an outer circumferential section of the power generation elements 22. The seal can also be omitted, as appropriate, in accordance with a configuration of the electrolyte (electrolytic solution).

As indicated in FIG. 18, the restraints 80 are substantially U-shaped in cross section, and have a first contact section 81, a second contact section 88, and a connecting section 89, and are used for restraining the battery body 20F in the stacking direction S. The first contact sections 81 and the second contact sections 88 apply a restraining force to the collectors 96 positioned on one and another outermost layer of the battery body 20F.

In the sixth modification, a collector 96 for functioning as a negative electrode collector and a collector 96 for functioning as a positive electrode collector are positioned in one and the other outermost layer of the battery body 20F. Consequently, the first contact sections 81 are in contact with a collector 96 for functioning as a negative electrode collector.

The first contact sections 81 are therefore configured so that a stress occurring at boundaries $B_1$ (see FIG. 8) of contact regions 33A and a non-contact region 33B is less than a breaking strength of the collectors 96. In other words, the stress occurring at the boundaries (periphery of the contact regions 33A) $B_1$ is made less than the breaking strength of the collectors 96. Consequently, it is possible to suppress splitting of the collectors 96 at the boundaries (periphery of the contact regions 33A) $B_1$, caused by expansion and contraction of the silicon-containing negative electrode active material layers.

In FIG. 16, the collector 96 positioned in an uppermost layer does not have a positive electrode active material layer 64, and the collector 96 positioned in a lowermost layer does not have a negative electrode active material layer 34. The reason for this is that a positive electrode active material layer 64 and a negative electrode active material layer 34 positioned on outsides of collectors 96 positioned in the uppermost layer and the lowermost layer do not participate in a battery reaction. However, as needed, the battery can also be configured so as to have a bipolar electrode structure.

In the secondary battery according to the present embodiment described above in which a negative electrode active material layer containing silicon is applied, a configuration is adopted whereby stress occurring at the boundaries of the non-contact region and the contact regions of the first contact sections is less than the breaking strength of the negative electrode collectors, and the stress is relieved. Splitting of the negative electrode collectors at the boundaries (periphery of the contact regions) of the contact regions and the non-contact region is therefore suppressed. In other words, a secondary battery can be provided in which it is possible to suppress splitting of the negative electrode collectors caused by contraction and expansion of the silicon-containing negative electrode active material layers.

When the first contact sections are configured so as to expand and contract in accordance with contraction and expansion of the negative electrodes, stress occurring at the boundaries of the non-contact region and the contact regions of the first contact sections can be relieved by the expansion and contraction of the first contact sections. In other words, the stress can be made less than the breaking strength of the negative electrode collectors.

When slits are provided which extend toward the base section from the end face and reach at least to a position facing the boundary of the facing section and the non-facing section, stress occurring at the boundaries of the non-contact region and the contact regions of the first contact sections, positioned at end faces of the first contact sections, can be dispersed (relieved) by expansion and contraction of the slits along the end faces (in the extension direction of the end faces) of the first contact sections.

When slits are provided which extend from a side face toward another side face, stress occurring at the boundaries of the non-contact region and the contact regions of the first contact sections, positioned at end faces of the first contact sections, can be dispersed (relieved) by expansion and contraction of the slits along the side faces (in the extension direction of the side faces) of the first contact sections.

When the first contact sections are formed from an adhesive material having elasticity which enables the adhesive material to follow expansion and contraction of the negative electrodes, stress occurring at the boundaries of the non-contact region and the contact regions of the first contact sections, positioned at end faces of the first contact sections, can be dispersed (relieved) by expansion and contraction of the first contact sections as such. When the restraints are formed entirely from the adhesive material, the structure of the restraints can be simplified.

When the first contact sections have an adhesive material layer formed from an adhesive material having elasticity which enables the adhesive material to follow expansion and contraction of the negative electrodes, and a base material layer for supporting the adhesive material layer, the adhesive material (adhesive material layer) is easily handled.

When the first contact sections have an adhesive material layer and a base material layer for supporting the adhesive material layer, and the adhesive force generated by the adhesive material layer is set so as to be less than the breaking strength of the negative electrode collectors, stress occurring at the boundaries of the non-contact region and the contact regions of the first contact sections can be relieved and made less than the breaking strength of the negative electrode collectors. When the adhesive material constituting the adhesive material layer is disposed intermittently on the base material layer, the adhesive force generated by the adhesive material layer can easily be set.

When the restraints are formed from a pressure-sensitive-adhesive film, the structure of the restraints can be simplified.

When the area of the negative electrode active material layers is greater than the area of the positive electrode active material layers, an effect of misalignment on the facing area can be suppressed, and fluctuation in power generation capacity can be prevented.

The present invention is not limited to the embodiment described above, and various modifications thereof are possible within the scope of the claims. For example, the secondary battery can also be used in the form of a serialized and/or parallelized assembled battery. The method for configuring the first contact sections so as to expand and contract in accordance with expansion and contraction of the negative electrodes is not limited to providing slits or using an adhesive material having elasticity which enables the adhesive material to follow expansion and contraction of the negative electrodes. Furthermore, the first to fifth modifications can also be applied and used in the sixth modification.

The invention claimed is:

1. A secondary battery comprising:
   a battery body having a plurality of stacked power generation elements; and
   a restraint restraining the battery body in a stacking direction of the power generation elements;
   the power generation elements having a positive electrode having a positive electrode collector in which a positive electrode active material layer is disposed, an electrolyte layer containing an electrolyte, and a negative electrode having a negative electrode collector which includes a negative electrode active material layer containing silicon;
   the positive electrode active material layer and the negative electrode active material layer facing each other, and being interposed by the electrolyte layer;
   the restraint having a first contact section and a second contact section that respectively contact a surface of one outermost layer and another outermost layer of the battery body in the stacking direction and that apply a restraining force;
   the negative electrode being positioned in the one outermost layer, and a surface of the negative electrode having a contact region in contact with the first contact section and a non-contact region which is not in contact with the first contact section, the surface of the negative electrode having the contact region and the non-contact region being the same surface;
   the first contact section being configured so that a stress occurring at a boundary of the contact region and the non-contact region is less than a breaking strength of the negative electrode collector;
   the stress being based on the restraining force of the first contact section, and expansion and contraction of the negative electrode due to a change in volume of the negative electrode active material layer caused by charging and discharging;
   the restraint having a connecting section that connects the first contact section and the second contact section;
   the connecting section extending alongside the battery body in the stacking direction;
   the negative electrode active material layer having a facing section facing the positive electrode active material layer, interposed by the electrolyte layer, and a non-facing section positioned on a periphery of the facing section and not facing the positive electrode active material layer;
   the first contact section being substantially rectangular and has a base section linked to the connecting section, an end face positioned on an opposite side from the base section, side faces for linking the end face and the base section, and a first slit; and
   the first slit extending toward the base section from the end face and reaches at least to a position facing a boundary of the facing section and the non-facing section.

2. The secondary battery according to claim 1, wherein the first contact section is configured so as to expand and contract in accordance with expansion and contraction of the negative electrode.

3. The secondary battery according to claim 1, wherein the first contact section further comprises a second slit extending from one of the side faces toward another of the side faces.

4. The secondary battery according to claim 1, wherein the restraint is formed from a pressure-sensitive-adhesive film having an adhesive material layer and a base material layer that supports the adhesive material layer; and
   the restraining force of the first contact section is based on an adhesive force generated by the adhesive material layer.

5. The secondary battery according to claim 1, wherein the restraint is formed from a pressure-sensitive-adhesive film.

6. The secondary battery according to claim 1, wherein the negative electrode active material layer has an area that is greater than an area of the positive electrode active material layer.

* * * * *